United States Patent [19]

Chichester

[11] Patent Number: 5,772,512
[45] Date of Patent: Jun. 30, 1998

[54] ELECTRONIC FOOTBALL GAME

[75] Inventor: Ronald L. Chichester, Kingwood, Tex.

[73] Assignee: Clutchability, L.L.C., Houston, Tex.

[21] Appl. No.: 688,861

[22] Filed: Jul. 31, 1996

[51] Int. Cl.[6] .................................................. A63F 9/22
[52] U.S. Cl. ............................................................ 463/40
[58] Field of Search ................................. 463/4, 40, 41, 463/42, 16, 1; 364/410, 412

[56] References Cited

U.S. PATENT DOCUMENTS

| | | | |
|---|---|---|---|
| 4,662,635 | 5/1987 | Enokian | 463/4 X |
| 4,918,603 | 4/1990 | Hughes et al. | 463/4 |
| 5,018,736 | 5/1991 | Praisen et al. | 463/41 |
| 5,083,800 | 1/1992 | Lockton | 463/40 |
| 5,462,275 | 10/1995 | Lowe et al. | 463/4 |
| 5,586,257 | 12/1996 | Pulman | 463/42 |

*Primary Examiner*—Jessica Harrison
*Assistant Examiner*—Michael O'Neill
*Attorney, Agent, or Firm*—John R. Casperson; Ron Chichester

[57] ABSTRACT

A game system is implemented on a digital computer that is connected to a network such as the Internet. The game system enables a user to chose members of a football team and play a game of football against an opponent at a remote location. A copy of all game parameters are stored in two different media—a RAM and a disk memory. The user's graphical and keyboard inputs are fed into the RAM as events initiated by the user. The opponent's inputs are fed into the user's disk memory as write statements. A microprocessor is used periodically and systematically to compare the parameters in the user's RAM to the parameters stored in the user's disk memory. If there is a discrepancy between the RAM parameters and the disk memory parameters, the microprocessor will update any of the parameters on the user's RAM or send write signals to update the opponent's disk memory based upon the type of discrepancy detected.

11 Claims, 9 Drawing Sheets

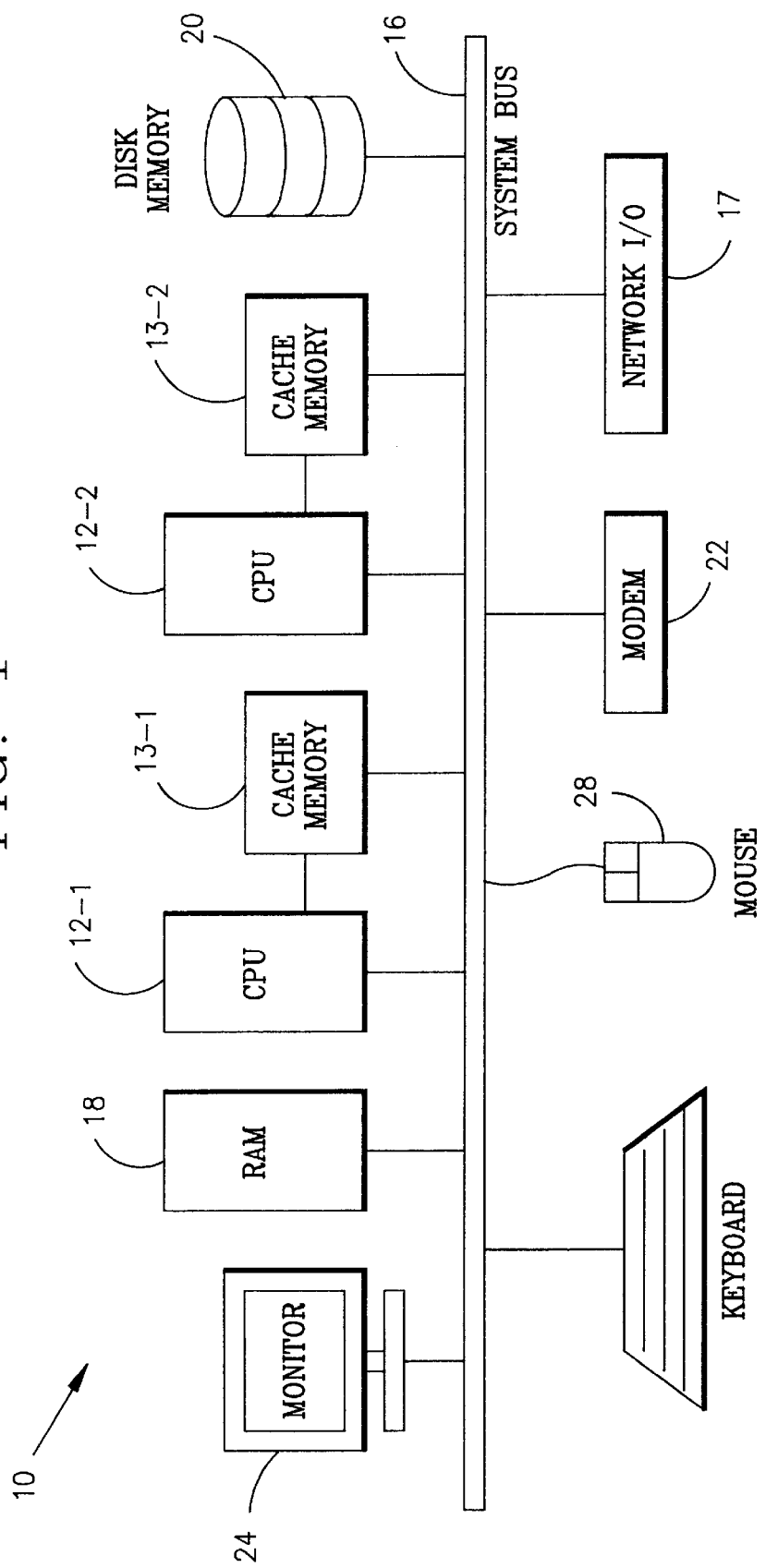

| 312' | 300' | | | 500' | |
|---|---|---|---|---|---|
| | Bet-on-individual-play indicator | 310' | | Offensive time-out indicator | 510' |
| | Play-selection list | | | Defensive time-out indicator | 512' |
| | Yards rushing | 314' | | Offensive play card slot | 514' |
| | Yards passing | 316' | | Defensive play card slot | 516' |
| | Total offense | 318' | | Play result indicator | 518' |
| | Total defense | 320' 600'— | | Composition of the first football team | 610' |
| | Field goals made | 322' | | Composition of a second football team | 612' |
| | Field goals missed | 324' | | Gridiron | 614' |
| | Kick-off return yards | 326' | | Yard marker | 616' |
| | Punt return yards | 328' | | Down indicator | 618' |
| | Bet-on-individual-play amount | 330' | | Player marker | 620' |
| | Bet-on-score indicator | 332' | | Score indicator | 622' |
| | First-quarter bet-on-score amount | 334' | | Possession indicator | 624' |
| | Second-quarter bet-on-score amount | 336' | | Quarter indicator | 626' |
| | Third-quarter bet-on-score amount | 338' 700'— | | Yards rushing indicator | 710' |
| | Fourth-quarter bet-on-score amount | 340' | | Yards passing indicator | 712' |
| | Bet-on-point-spread indicator | 342' | | Total offense indicator | 714' |
| | Choose-spread indicator | 344' | | Total defense indicator | 716' |
| | Point-spread input box | 346' | | Field goals made indicator | 718' |
| | Bet-on-point-spread amount | 348' | | Field goals missed indicator | 720' |
| | Current-bet award indicator | 350' | | Kickoff return yardage indicator | 722' |
| | Total-bet award indicator | 352' | | Punt return yardage indicator | 724' |
| 400'— | First time-out hand | 410' | | | |
| | Second time-out hand | 412' | | | |
| | First play hand | 414' | | | |
| | Second play hand | 416' | | | |
| | Playing deck | 418' | | | |
| | Special teams deck | 420' | | | |
| | Penalty deck | 422' | | | |

FIG. 5 ns
5,772,512

ELECTRONIC FOOTBALL GAME

BACKGROUND OF THE INVENTION

1. Field of the Invention

The present invention relates to games. More particularly, the present invention relates to a football game implemented on a digital computer that allows a player to play either against another player at a remote location or against the computer alone.

2. Description of the Prior Art

A superscalar computer system comprising a plurality processors and a bus system is illustrated in FIG. 1. The computer system 10 comprises a plurality of processors 12, 13, and 17. The processors are divided into two groups, the master processors 12, 13, and 17, and the slave processors 18, 20, 22, 24. Devices which access data from other devices (i.e., the CPUs 12-1 to 12-2, their associated cache memories 13-1 to 13-2, and the network I/O adapter 17) are referred to as "masters." In general, the master processors 12, 13, and 17 communicate to the slave processors 18, 20, 22, 24 particular commands to be carried out. Data is exchanged between the masters and slaves in response to these commands. For example, the master processors 12, 13, 17 generate write commands for writing particular data into particular slave processors 18, 20, 22, 24. The master processors 12, 13, 17 also generate read commands for reading data from particular slave processors 18, 20, 22, 24. As shown in FIG. 1, a master processor may be a CPU 12, a cache memory 13, or an network I/O adapter 17. A slave processor is typically a memory such as a main memory 18, disk memory 20, or a peripheral device such as a modem 22 or monitor 24. There may be a plurality of both master processors and slave processors in the computer system 10.

The main memory 18 is for storing data and is typically formed by one or more dynamic random access memory integrated circuits (DRAMs). Such DRAM main memories 18 are relatively inexpensive. The main memory 18 typically has a memory array of storage locations. Each storage location can store a data word of a fixed length, e.g., eight bit long or byte long data words. Each storage location has a unique identifier which is used in data access, i.e., read and write, commands for specifying the particular storage location from which data should be read or into which data should be written. Illustratively, the storage locations are further organized into data line storage locations for storing fixed length (e.g., thirty-two byte long), non-overlapping, contiguous blocks of data called data lines. Each data line storage location has a unique line address similar to the aforementioned addresses for specifying a particular data line storage location to read a data line from or to write a data line into.

The master and slave processors are interconnected by a system bus 16. The system bus 16 is for transferring information in the form of data, addresses and commands between processors. The various processors include CPUs 12-1 to 12-2, their associated cache memories 13-1 to 13-2, the main memory 18, and the network I/O adapter 17, connected thereto. The system bus 16 can be viewed as comprising a set of wires. The system bus 16 is a shared resource, each of the processors attempt to utilize the system bus at one time or another for purposes of transferring data, addresses or commands. Sometimes, more than one processor contends to utilize the system bus 16 at the same time. However, only a limited number of processors illustratively can utilize the system bus 16 at one time. To resolve this contention, the computer system 10 is provided with an elaborate arbitration protocol for allocating the system bus 16, in a fair and orderly manner, to each processor contending to use it.

The CPU processors 12-1 to 12-2 are for executing program instructions. Examples of instructions are: arithmetic or logical operations on data; program flow control instructions for ordering the execution of other instructions; and memory access commands. In the course of executing these instructions, the processors 12-1 to 12-2 may issue data access, i.e., data read and data write, commands. The program instructions themselves are stored as data in the shared memory 18.

The cache memories 13-1 to 13-2 are small, high speed memories for maintaining a duplicate copy of data stored in the shared main memory 18. Cache memories are typically formed by high speed static random access memory integrated circuits (SRAMs). The cache memory may also be part of the integrated circuit of the CPU 12. As cache memory is considerably more expensive than the slower main memory, the size of cache memory is typically much smaller than the amount of main memory 18. Despite their relatively small size in comparison to the main memory 18, the cache memories dramatically reduce the need to access data from the main memory 18. This is because cache memories 13-1 to 13-2 exploit temporal and spatial locality of reference properties of processor data accesses. Temporal locality of reference is the tendency of processors 12-1 to 12-2 to access the same data over and over again. The temporal property arises from program flow control instructions such as loops, branches and subroutines which cause the processors 11-1 to 11-2 to repeat execution of certain recently executed instructions. Spatial locality of reference refers to the tendency of processors to access data having addresses near the addresses of other recently accessed data. The spatial property arises from the sequential nature of program instruction execution, i.e., the processor tends to execute instructions in the sequential order in which they are stored as data. In order to exploit this property, cache memories typically store an entire data line corresponding to a recently accessed data line. In addition, memory references to non-instruction data tend to be localized to a lesser degree. Non-instruction data tend to be stored in tables, arrays and frequently accessed variables. Thus, the CPUs 12 tend to access repeatedly the data stored in the same localities in memory. Consequently, the likelihood increases that the cache memories 13-1 to 13-2 can satisfy future accesses to data not yet accessed (assuming that future accesses will be to other data corresponding to the data lines already stored in the cache memories 13-1 to 13-2).

The cache memories 13-1 to 13-2 work as follows. When the corresponding processor, e.g., the processor 12-1, issues a data access command, the associated cache memory 13-1 determines if it contains the particular data. If so, a read or write (depending upon whether the processor issued a read or write command) "hit" is said to occur and the cache memory 13-1 satisfies the processor data access using the copy of the data within the cache memory. If the cache memory 13-1 does not contain the designated data, a read or write "miss" is said to occur. In the event of a read or write miss, the cache memory 13-1 issues a command for reading or writing the data line corresponding to the designated address from or to the main memory 18, respectively via the system bus 16. In the case of a read or write miss, the cache memory 13-1 issues a read command (including the particular address of the data) to the main memory 18 via the system bus 16. In response to receiving the read command, the main memory 18 retrieves the data stored therein at the particular address and transfers this retrieved data via the system bus 16 to the cache memory 13-1. The cache memory 13-1 stores the data transferred from the main memory 18 and then continues as if the data were already present in the cache memory 13-1.

Cache memories 13-1 to 13-2 must maintain the consistency of the data in the main memory 18. That is, while a cache memory 13-1 to 13-2 may modify its copy of the data, the counterpart copy of the cache memory's data in the main memory 18 must invariably be accordingly modified. According to one memory-consistent manner of operating a cache memory (e.g., the cache memory 13-1) called "write through," the cache memory 13-1 immediately attempts to update the counterpart copy in the main memory 18 whenever the processor 12-1 modifies the cache memory's copy of the data. The write through manner of operating the cache memory is disadvantageous because the cache memory 13-1 must continually use the system bus 16 to issue write commands and sent data to the main memory 18 each time the associated processor 12-1 modifies the data.

In order to reduce the demands on the relatively slow main memory 18 and system bus 16, the cache memories 13-1 to 13-2 operate in a manner called "write back." According to this manner of operation, each cache memory 13-1 to 13-2 defers updating or writing back the modified data line until a later time. For instance, if the cache memory, e.g., the cache memory 13-1, runs out of storage space, the cache memory 13-1 may write back a modified data line to provide an available storage space for an incoming data line. Alternatively, the cache memory 13-1 may "snoop" the system bus 16 waiting for another processor to attempt to read a particular data line. When such an attempt occurs, the cache memory 13-1 will then write back its modified data line so that the other device will receive the updated version of the particular data line.

Another method to maintain the consistency of the data in the main memory 18 amongst all of the cache memories 13-1 to 13-2 includes the use of an elaborate arbitration protocol for "claiming ownership" in data lines. A cache memory which successfully "claims ownership" in a data line has priority to modify the data therein. Otherwise, the cache memory is not permitted to modify the data line.

The maintenance of data consistency is handled by various "agents" that "snoop" and "snarf" the data. Typical agents include a "write back agent", a "memory subsystem agent" and one or more "snarf agents." A "write back agent" is a device, such as the cache memory 13-2, which writes back a modified data line. A "memory subsystem agent" is a device, such as the main memory 18, in which the integrity of the data must be maintained. A "snarfing agent" is a device, such as the cache memory 13-1, which has been snooping the system bus 16 to look for attempts to claim ownership in the particular data line. When the write back agent (cache memory 13-2) writes back the data line to the memory subsystem agent (main memory 18), the snarfing agent (cache memory 13-1) snarfs (intercepts a copy of) the data. This memory reflection scheme requires approximately one half of the time of the non-snarfing process. Moreover, the memory reflection scheme utilizes only one data transfer on the system bus 16 to transfer data to the destinations contemporaneously.

A simpler (non-superscalar) computer system 10' is shown in FIG. 2. The simpler computer system 10' is more commonly known as a personal computer (PC) and of the type found in many homes. Unlike the superscalar computer system 10, the PC 10' comprises a single processor 12, which is a CPU, and no cache memory. Like the superscalar system, the PC has various slave processors such as a main memory 18, a disk memory 20, and a peripheral device such as a modem 22 or monitor 24. All of these devices are interconnected by system bus 16. Because the PC does not comprise multiple master processors, the sophisticated protocols for handling multiple and simultaneous demands of common memory lines are not necessary. Even so, multiple PCs can be linked into a network such as the Internet. In the home computing industry, such a link is established with the aid of a modem in a PC 30 that is connected via a phone line (not shown) to a first network server 32 as shown in FIG. 3. The first network server 32 may be electrically connected by wires 35 to another network server 34 which servers as the network server for a second PC 36 as shown in FIG. 3. In this way, a signal connection is established between the first PC 30 and the second PC 36.

In the early days of computing, software programs were serial in nature. The programs "flowed" from the beginning to the end. The run command and specific parameters were provided on the "command line" at the start of program execution. Any branching within the program was the result of data that was defined before the software program was executed. Once executed, the software ran from the beginning to the end with essentially no intervention by the user. Serial software programs typically did not have user interfaces.

With the advent of the graphical-user paradigm and the invention of the mouse, software programs were integrated with the new interface mechanisms. Consequently, software architecture changed from serial execution to "event"execution. "Events" occur, for example, when the user pushes a button on the keyboard or clicks the mouse on an object on the window. Software language compilers have been adapted to accommodate events. These compilers make "event-driven" programs. Examples of common event-driven software compilers are VISUAL BASIC by the Microsoft Corporation and DELPHI by Borland International Corporation. Both of these event-driven software compilers create software programs which handle keyboard and mouse events by the user and reflect the results of the events immediately on the display monitor and, more importantly, on corresponding parameters in RAM.

DELPHI provides links to "methods" which can be invoked upon the occurrence of user events on objects on the display monitor. The user triggers these methods upon performing the event. The methods can contain code that can perform certain functions. For example, a window object can contain an edit field for an integer number. The user is allowed to edit the number which triggers the "OnChange" event for the edit field object. The program can include code in the "OnChange" method to perform an update based upon the new integer value in the edit field. In this example, such an update may include changing a value in a memory register in RAM, writing the new value to disk memory, or performing a calculation and changing some other object in the display monitor to reflect changes in the integer value or the results of the calculation.

Common event-driven software compilers make useful programs for typical PCs. However, the programs made by these compilers are not expected to operate in a superscalar computer system. Consequently, programs made by these compilers do not recognize screen events from anyone other than the user. While these software compilers make programs that easily manipulate parameters on the display monitor and in random access memory (RAM) based upon user inputs, the programs cannot be used effectively when a remote operator is initiating an event.

Various prior art solutions to the "remote-user" event has been to add extra code to the program that monitors the network traffic. In this sense, the extra code acts as an intermediary between the user's program and the remote-user's program. The extra code, in this scenario, must both receive and interpret the signal that arrived over the network. For instance, the "event" signals had to be sifted from other signals (such as a carrier or line-verification signal). This prior art solution is undesirable because of the added cost, complexity, and staff required to build, facilitate, and maintain the extra code. Response time over a network such as the Internet can be lengthy. Extra code can stress overhead facilities in the user's computer system, degrading perceived performance.

Another problem in the prior art is data synchronization in the event of a loss of network signal, loss of network connection, or power failure. RAM based programs are particularly vulnerable to power failures. RAM based programs have little or no ability to revive the status of the program at the time of the failure. Remedies in the prior art include making backup copies on a periodic basis, in order to lessen the amount of data lost. Other remedies have included data replication—although this method has been limited to preserving the integrity of large relational databases.

There is, therefore, a need in the art for enabling event-driven programs to recognize and react to remote user events. There is also a need in the art for programs of reduced size and complexity in order to increase performance. Finally, there is a need in the art for network based software that is more tolerant of network signal loss or disconnection. It is an object of the present invention to remedy problems in the prior art.

SUMMARY OF THE INVENTION

This and other objects are achieved by the present invention. According to one embodiment, a game system is implemented on a digital computer that is connected to a network such as the Internet. The game system utilizes several windows on a display such as a computer monitor. These windows include a game status window, a play execution window, a bet status window, a game statistics window, and a card status window. A copy of all game parameters are stored in two different media—RAM and disk memory. The user's graphical and keyboard inputs are fed into the RAM as events initiated by the user as is typical with event-driven programs. A microprocessor is used periodically and systematically to compare the RAM parameters to the parameters stored in the disk memory. If there is a discrepancy between the RAM parameters and the disk memory parameters, the microprocessor will update any of the user's windows, or send a signal to the opponent's computer, based upon the type of discrepancy detected. The microprocessor will also update the parameters on either the users's disk memory or the user's RAM so that they are identical.

If the opponent initiated the event, an appropriate write signal will be sent over the network to the user's disk memory in the form of a write statement. Similarly, a signal signifying a user's event is sent to the opponent's computer as a write statement to the opponent's disk memory. This causes a discrepancy between either the opponent's RAM and his disk memory or the user's RAM and the user's disk memory. This discrepancy will be detected by the respective microprocessor and the respective display will be updated accordingly.

The dichotomy between the RAM/disk-memory parameters is particularly useful when the user is playing a remote opponent over a network. In a minimally sized software program, the user's events immediately affect only the parameters in the user's RAM. Opponent events immediately affect only the parameters in the user's disk memory. Normally, this would cause an error in the display device because the opponent's events would not be reflected in the user's display device. However, an embodiment of the present invention solves this problem by utilizing a microprocessor to compare, systematically and periodically, the parameters is both memory media in order to detect discrepancies. The detection of a discrepancy between the parameter copies is used as a trigger to initiate updates to the display and parameters on the user's computer based upon the type of discrepancy detected. In addition, because there is often a significant "idle" time between user and opponent events, the number of microprocessor (and data bus) cycles devoted the comparison with RAM can be substantially reduced and those resources allocated to the network or user-interface. The latter aspect leads to faster perceived performance.

An alternate embodiment of present invention can utilize the computer system motherboard's data bus architecture to resolve memory conflicts. Such memory conflicts occur when the user's event is contemporaneous with the opponent's event. In an embodiment of the present invention, the user's input is directed to the RAM and the opponent's input is directed to the mass-storage media by the data bus on successive data bus cycles automatically by the motherboard/data-bus allocation process. Only after both inputs are registered in their respective devices will the microprocessor detect a discrepancy on a subsequent data bus/microprocessor cycles.

The preferred embodiment of the present invention mimics the snooping/snarfing capability of a multi-processor (superscalar) computer system. The user's CPU acts as the first processor, the opponents CPU acts as the second processor. All game parameters are stored on the user's disk memory. In this embodiment, the opponent's machine is not required to have disk memory, allowing for a simpler, less expensive computer system and centralized disk memory storage. When an opponent's event is written to the user's disk memory, the user's program, acting as a snooping agent, will snoop the opponent's write signal and snarf the data (triggering an update event on the user's PC). If the user initiates the event, the user's processor will send a dual write signal to the disk memory and to the user's modem for transmission to the opponent's program (in RAM) on his PC. The snooping/snarfing scheme reduces data bus traffic and reduces perceived response time of the game system on crowded networks.

In all embodiments of the present invention, the amount of software needed to implement the game system is smaller than normal because the software is adapted to capitalize on the capabilities inherent in computer systems employing a data bus. This relieves the game system software from using special software for monitoring the network port for incoming signals from the opponent. The number of microprocessor cycles used for monitoring can thus be reduced and the software needed for port monitoring is eliminated. Consequently more cycles can be allocated to the user interface which results in faster perceived performance by the user. Finally, because the mass-storage memory is used as an intermediary, the game system is very tolerant of power failures and network disconnection.

BRIEF DESCRIPTION OF THE DRAWINGS

FIG. 1 shows a schematic of a superscalar computer system devices interconnected by a common data bus;

FIG. 5 shows a table of parameters on a disk memory of the present invention;

DETAILED DESCRIPTION OF THE PREFERRED EMBODIMENTS

Figure 3:
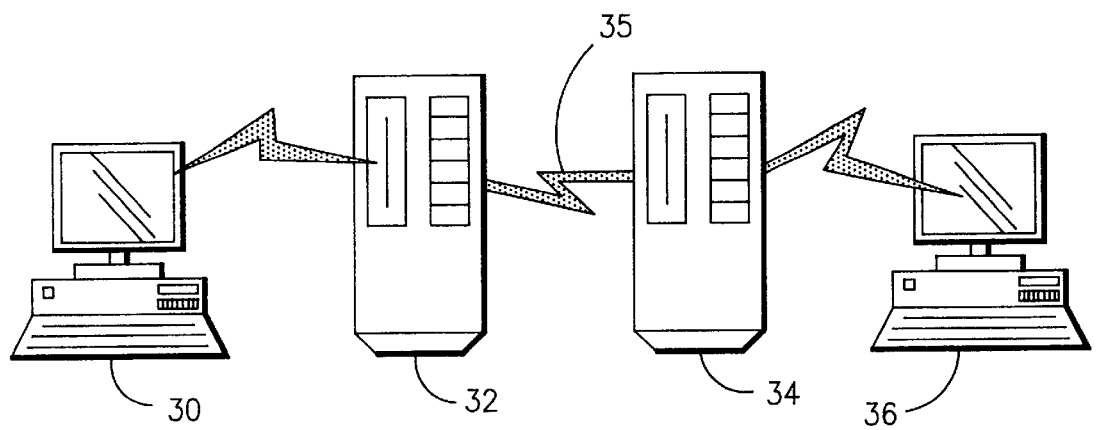
FIG. 3 shows a schematic of two PCs connected by a common network.
Figure 2:
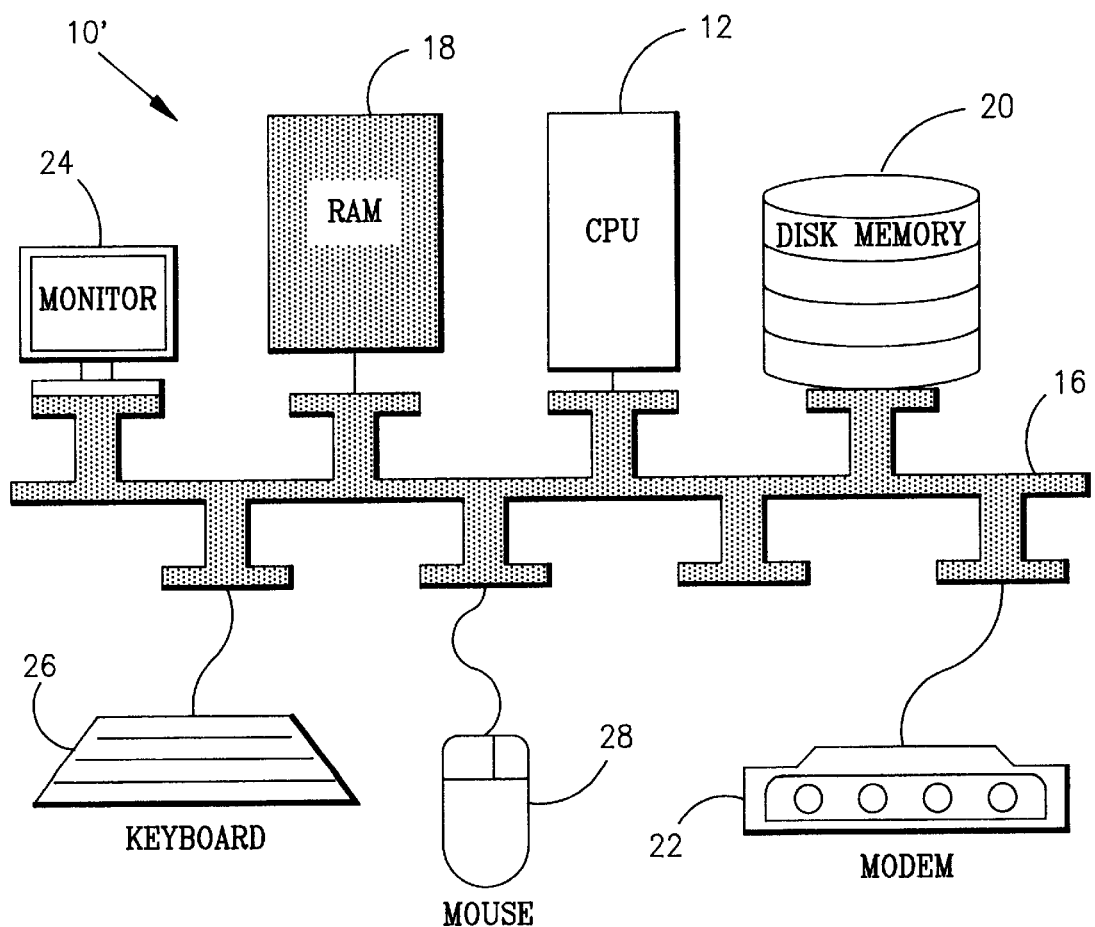
FIG. 2 shows a schematic of PC devices interconnected by a common data bus.

The present invention utilizes a typical PC system as shown in FIG. 2. Such a system 10' contains display monitor 24, a keyboard 26, a disk memory drive 20, main memory RAM 18, a mouse 28, a CPU microprocessor 12, and a modem 22. All of these devices are connected to a common data bus 16. The modem 22 is used to connect the user's computer 10' to an opponent's similarly configured computer (not shown). In some instances, the modem 22 can be substituted for a network adapter (not shown) which allows a direct connection to the network. For purposes of the present invention, a network adapter is an equivalent of a modem 22. An example of a suitable network software program 200 is as follows. Upon execution, the software program itself is loaded into the CPU 12 of the user's computer system 10'. Upon initialization of the program, the program 200 places the copies of the game parameters in the disk memory 20 into continuous and successive data lines in RAM 18. These parameters include the bet parameters 300, the card parameters 400, the play parameters 500, the game parameters 600, and the game statistics parameters 700.

In the preferred embodiment of the present invention, the software program 200 is equipped with: a game status window, a game window, a play execution window, a bet status window, a card status window, and a game statistics window that are displayed on the monitor 24. The RAM 18 contains information in data registers about the game including information regarding the two opposing teams, the last-executed play, any bets riding on the play, quarter or game. The RAM 18 also contains information in data registers about play cards, and statistics. Some or all of the information in RAM 18 can be directly manipulated via the program 200 by the user the through the graphical user interface (monitor 24, mouse 28, and keyboard 26).

Figure 4:
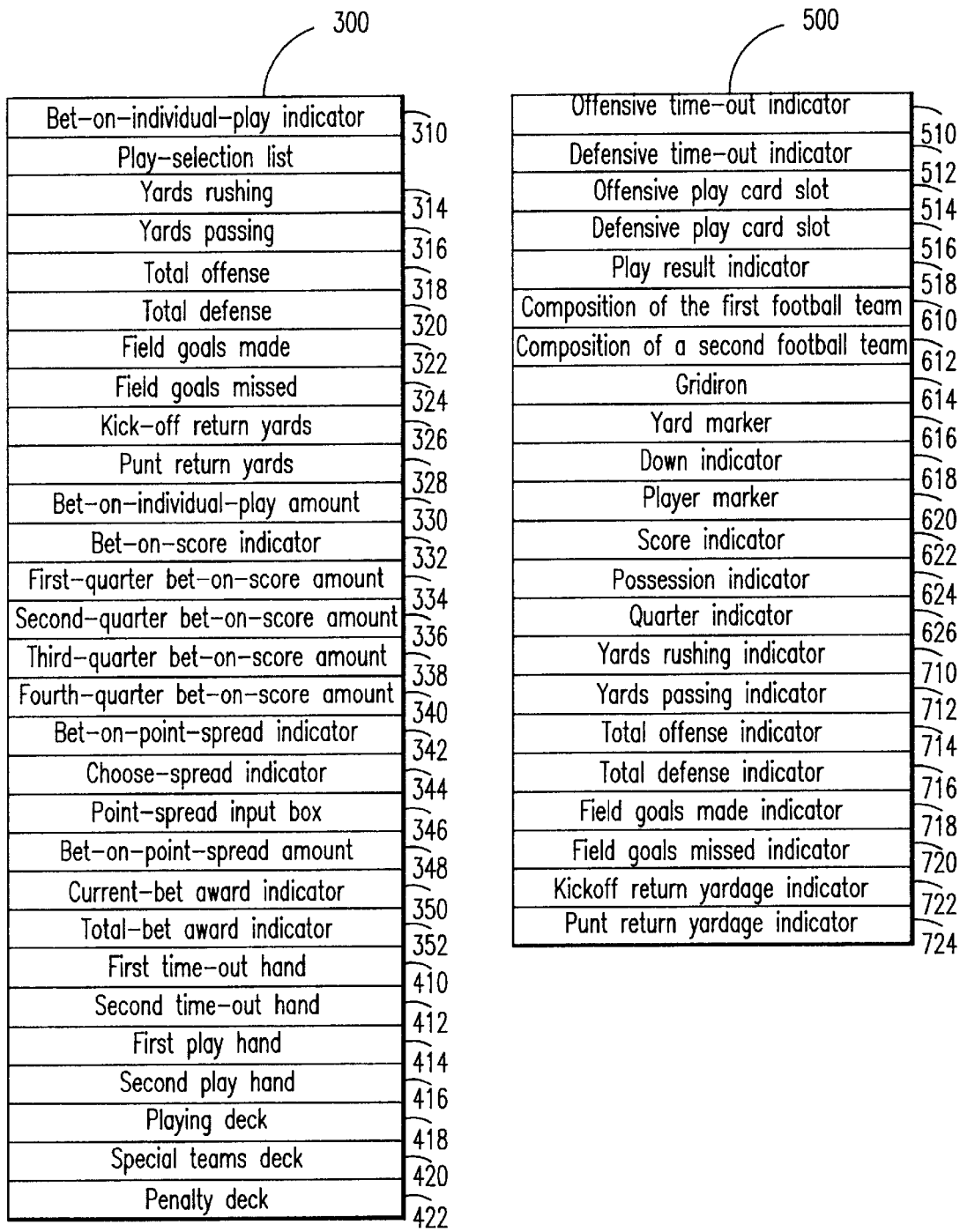
FIG. 4 shows a table of parameters in RAM of the present invention.

The bet parameters 300, as shown in FIG. 4, include: a bet-on-individual-play indicator 310; a play-selection list 312 consisting of the group of yards rushing 314, yards passing 316, total offence 318, total defense 320, field goals made 322, field goals missed 324, kick-off return yards 326, and punt return yards 328. Additional bet parameters 300 include: a bet-on-individual-play amount input box 330; a bet-on-score indicator 332; a first-quarter bet-on-score amount input box 334; a second-quarter bet-on-score amount input box 336; a third-quarter bet-on-score amount input box 338; a fourth-quarter bet-on-score amount input box 340, a bet-on-point-spread indicator 342; a choose-spread indicator 344; a point-spread input box 346; a bet-on-point-spread amount input box 348; a current-bet award indicator 350, and a total-bet award indicator 352. Each of the bet parameters 300 have a corresponding data register on the disk memory 20 as shown in FIG. 5. Each disk memory 20 parameter has a corresponding primed numeral to the parameter in RAM 18. For example, the total defense 320 parameter in RAM 18 would correspond to the total defense 320' parameter on the disk memory 20.

The card parameters 400, as shown in FIG. 4, include: a first time-out hand 410; a second time-out hand 412; a first play hand 414; a second play hand 416; a playing deck 418; a special teams deck 420; and a penalty deck 422. Each of the card parameters 400 have a corresponding data register on the disk memory 20 as shown in FIG. 5. Each disk memory 20 parameter has a corresponding primed numeral to the parameter in RAM 18. For example, the second time-out hand 412 parameter in RAM 18 would correspond to the second time-out-hand 412' parameter on the disk memory 20.

The play parameters 500, as shown in FIG. 4, include: an offensive time-out indicator 510; a defensive time-out indicator 512; an offensive play card slot 514; a defensive play card slot 516, and a play result indicator 518. Each of the play parameters 500 have a corresponding data register on the disk memory 20 as shown in FIG. 5. Each disk memory 20 parameter has a corresponding primed numeral to the parameter in RAM 18. For example, the defensive time-out indicator 512 parameter in RAM 18 would correspond to the defensive time-out indicator 512' parameter on the disk memory 20.

The game parameters 600, as shown in FIG. 4, include: the composition of the first football team 610; the composition of a second football team 612; a gridiron 614; twenty yard markers 616 that designate five-yard intervals spaced evenly on the gridiron 614; a down indicator 618; a player marker 620, a score indicator 622; a possession indicator 624; and a quarter indicator 626. Each of the game parameters 600 have a corresponding data register on the disk memory 20 as shown in FIG. 5. Each disk memory 20 parameter has a corresponding primed numeral to the parameter in RAM 18. For example, the composition of the second football team 612 parameter in RAM 18 would correspond to the composition of the second football team 612' parameter on the disk memory 20.

The game statistics parameters 700, as shown in FIG. 4, include: a yards rushing indicator 710; a yards passing indicator 712; a total offense indicator 714; a total defense indicator 716; a field goals made indicator 718; a field goals missed indicator 720; a kickoff return yardage indicator 722; and a punt return yardage indicator 724. Each of the game parameters 700 have a corresponding data register on the disk memory 20 as shown in FIG. 5. Each disk memory 20 parameter has a corresponding primed numeral to the parameter in RAM 18. For example, the yards passing indicator 712 parameter in RAM 18 would correspond to the yards passing indicator of the second football team 712' parameter on the disk memory 20.

Figure 10:
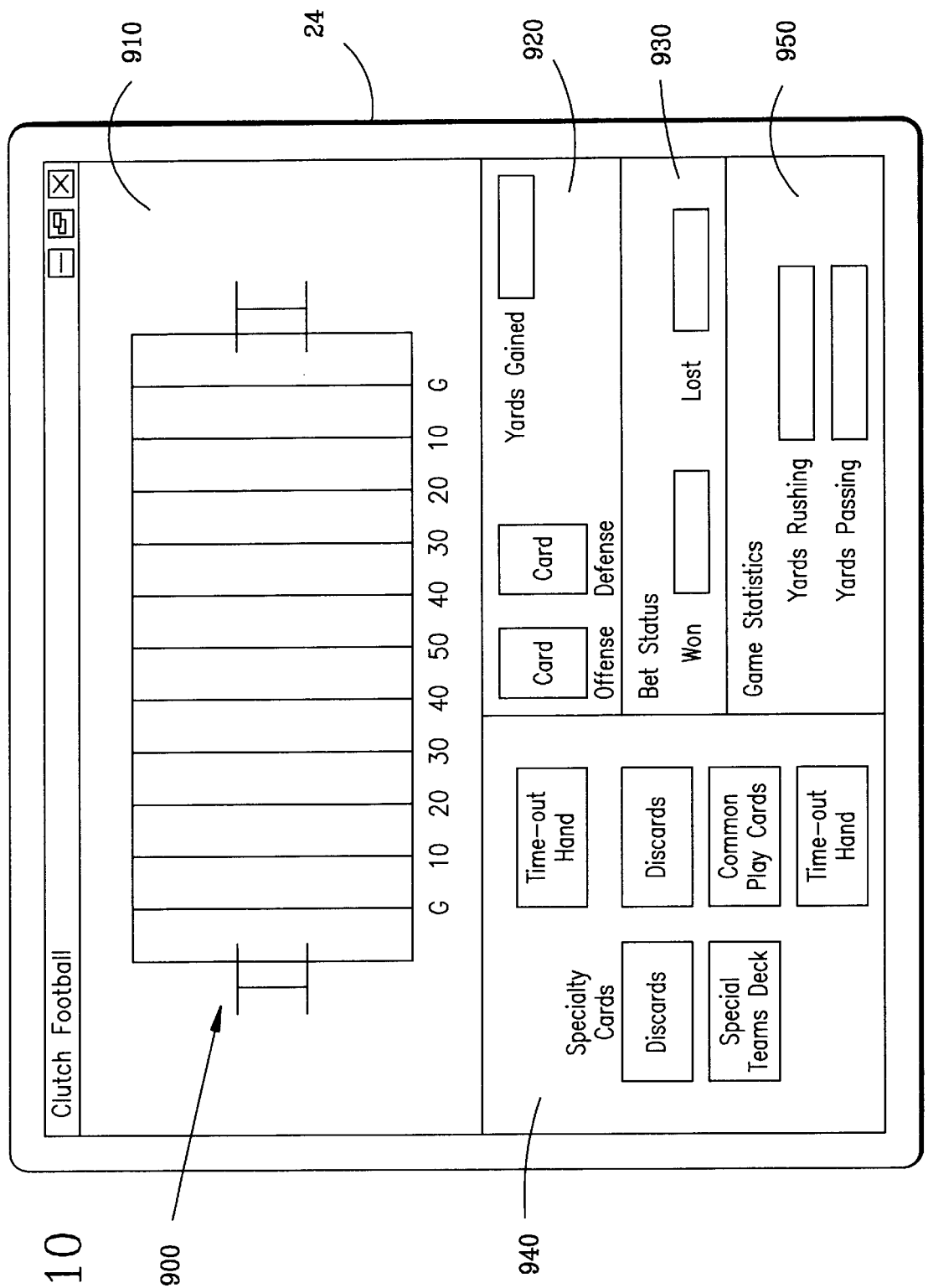
FIG. 10 shows a computer monitor that is displaying the game window, the game status window, the bet status window, the card status window, and the game statistics window of the present invention.
Figure 11:
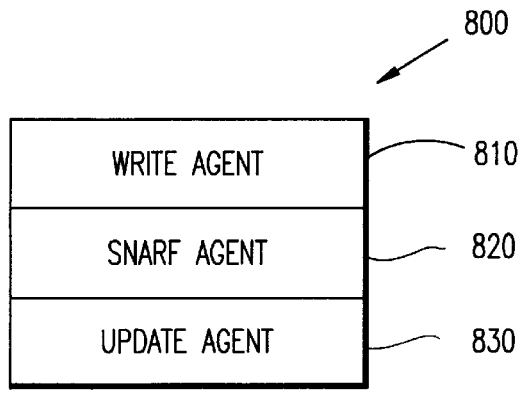
FIG. 11 shows the elements of the software program of the present invention.

Software program 800 resides in CPU 12 and contains a write agent 810 and a snarf agent 820 as shown in FIG. 11. In addition, as shown in FIG. 11, software program 800 contains an update module 830 which is used to update the RAM 18 parameters and perform the calculations necessary to update the windows 900 on the display monitor 24. As shown in FIG. 10, windows 900 include game window 910, play execution window 920, bet status window 930, card status window-identified game parameters on the disk memory 20 and RAM 18 are kept in an address table 40 within RAM 18. The address table 40 is used for both reading, and writing. For example, when a user event occurs that changes RAM 18 parameter 312, the program 800 references address table 40 to determine the memory location of the corresponding disk parameter 312' and instructs write agent 810 to issue an appropriate write statement overwrite disk parameter 312' with a copy of disk parameter 312. In addition, the write agent 810, when sending a write signal to overwrite the disk parameter 312' in the user's disk memory 20, will send a similar write signal to the remote user system 10' via the modem 22 in order to cause remote user program 800 to update the remote user's display 24. Similarly, when the snarf agent 820 of program 800 snoops the data bus 16 and detects a write statement to the address of disk parameter 312'(as a result of a remote user's event) the snarf agent 820 compares the address in the write statement to address table 40, recognizes that the corresponding RAM parameter 312 is referenced, and snarfs the updated parameter value from the data bus 16 and updates RAM parameter 312 and signals program 800 that an event has occurred. As before, an update to a RAM 18 parameter causes program 800 to conduct a series of calculations to determine if the changes to RAM parameter 312 affect any of the other RAM 18 parameters or any of the display windows 900, thereby triggering other update events.

In an alternate embodiment of the present invention, the snoop/snarf capability is not used. Instead, program 800 devotes several CPU 12 cycles periodically (at approximately five-second intervals) to scan the contents of the disk memory 20 and RAM 18 using the memory addresses in the address table 40 as a guide. The program 800 compares the RAM 18 parameters to their corresponding disk 20 parameters. If a discrepancy is found between the RAM 80 parameter and a corresponding disk 20 parameter, then program 800 issues an update event to windows 900, as before, based upon the type of discrepancy found.

Figure 6:
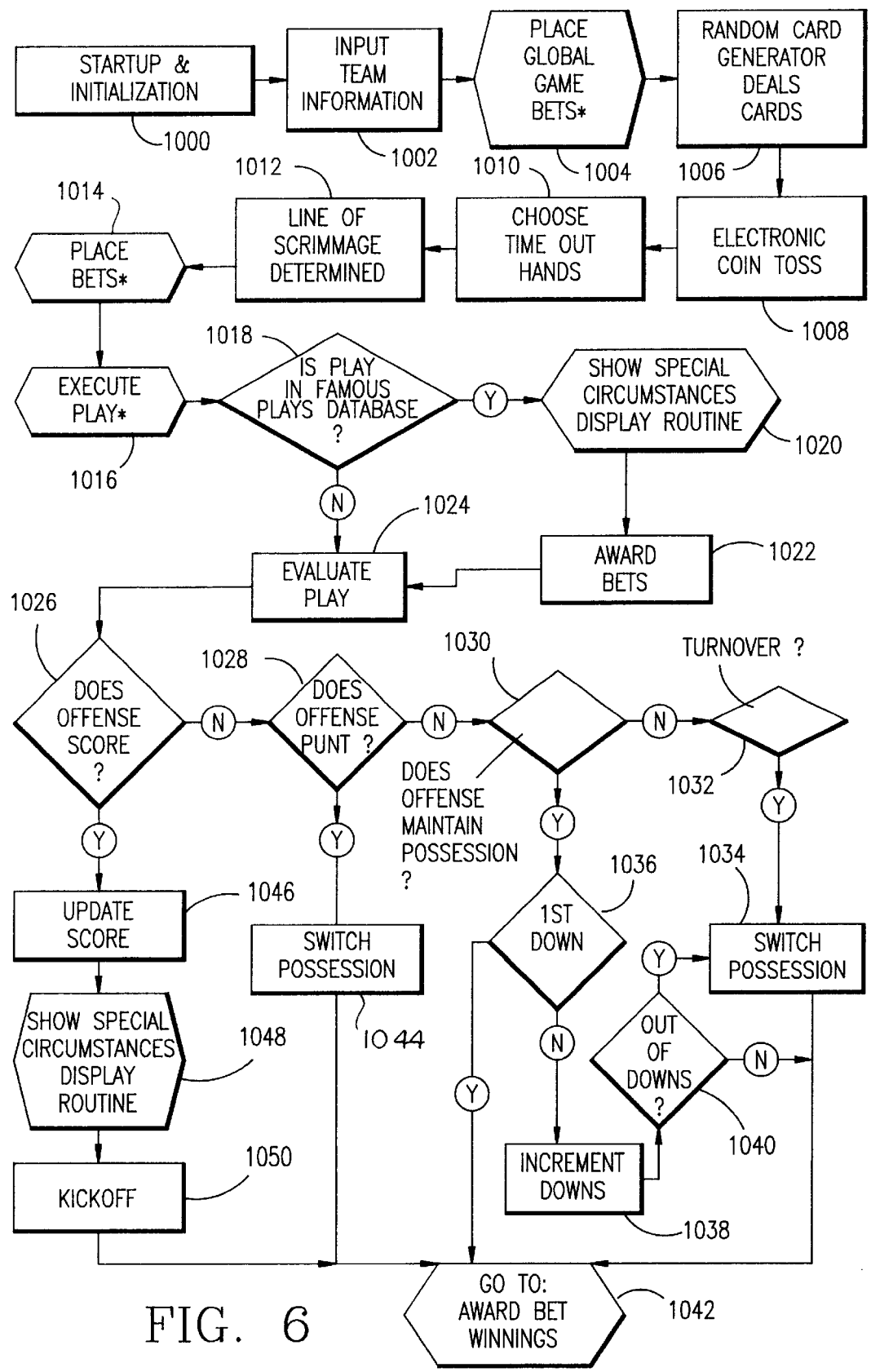
FIG. 6 shows a flowchart of the execution of the game of the present invention.

A flowchart of game execution is shown in FIG. 6. After the startup and initialization step 1000, the user inputs team information in step 1002. This input can include, for example, the name of the player, the player's team, and the age of the player. This would allow the assembling of "virtual" teams that can transcend the ages with each player at the peak year of his respective performance. After the teams are selected, the user may place global bets in step 1004. In step 1006, the program 800 deals cards randomly and updates card status window 940. In step 1008, the user is allowed to select "heads" or "tails" in a simulated coin toss. As a result of the coin toss, the user may elect to receive or defend, and which goal he chooses to complete step 1008. Based upon the cards dealt in step 1006, the user may select from his "hand" which cards are to be placed in the time out hands to complete step 1010. The user utilizes standard I/O devices, such as the mouse 28 or keyboard 26—interacting with the card status window 940—to accomplish this task. Next, in step 1012, the line of scrimmage (displayed in the game window 910) is determined according to the official rules of football. In step 1014, the user is allowed to place bets on the next play.

The subsequent play is executed in step 1016, of FIG. 6. After play execution step 1016, the play is compared to other plays kept in a famous plays database in step 1018. If the play is like a famous play (a positive result in the decision tree), then, in step 1020, a video clip of the famous play is displayed on the monitor 24. After the famous play video clip has been played, a special bet is awarded in step 1022. If the play executed in step 1016 was not a famous play (a negative result in step 1018), or after the award of bets in step 1022, then the play is evaluated in step 1024. In the evaluation process of step 1024, program 800 reviews the status of the cards, in order to determine which card was played by which player (i.e., the user or the opponent). During the evaluation process of step 1024, the number of yards gained (or lost) by the offensive team is determined. In step 1026 a determination of whether or not the offensive side has scored is made by subtracting the number of yards gained (as determined in step 1024) from the number of yard from the scrimmage line to the goal. Put simply, if the number of yards gained in step 1024 exceeds the number of yards from the line of scrimmage to the goal, then the offensive player scores. If the offensive player scored (a positive result in step 1026), the score is updated in the game window 910 in step 1046. After the score is updated, a special circumstances display routine is executed in step 1048. During the special circumstances display routine, a special play is executed to determine if an extra point will be awarded to the offensive side. After the [speci] a play, if the offensive player did not score (a negative result in step 1026), then the offensive player is given the option to punt in step 1028. If the offensive player chooses to punt, a punt play is executed in step 1044 and the possession of the ball is switched between the two players. If the offensive player chose not to punt in step 1028, then, in step 1030, the software determines if the offensive player retains possession of the football. If the answer in step 1030 is no (a negative result), then a turnover is declared in step 1032 and the players switch possession in step 1034. If the offensive player maintains possession in step 1030 (a positive result), then, in step 1036, it is determined whether the yards gained in the play are sufficient to award the offensive player a first down. If so, (a positive result in step 1036) then the number of downs are incremented up by one in step 1038. After step 1038, in step 1040, a determination is made whether or not the number of downs exceeds 4. If so (a positive result in step 1040), then the possession of the ball is switched in step 1034 as shown in FIG. 6. After the kickoff is step 1050, or after the switch of possession in step 1044 or 1034, or after a positive result in step 1036, an award of bets is made in step 1042. After the award of bets in step 1042, play resumes on step 1012 and the above process is repeated until either a time limit is exceeded, or the number of cards dealt in step 1006 has been exhausted a predetermined number of times.

Figure 7:
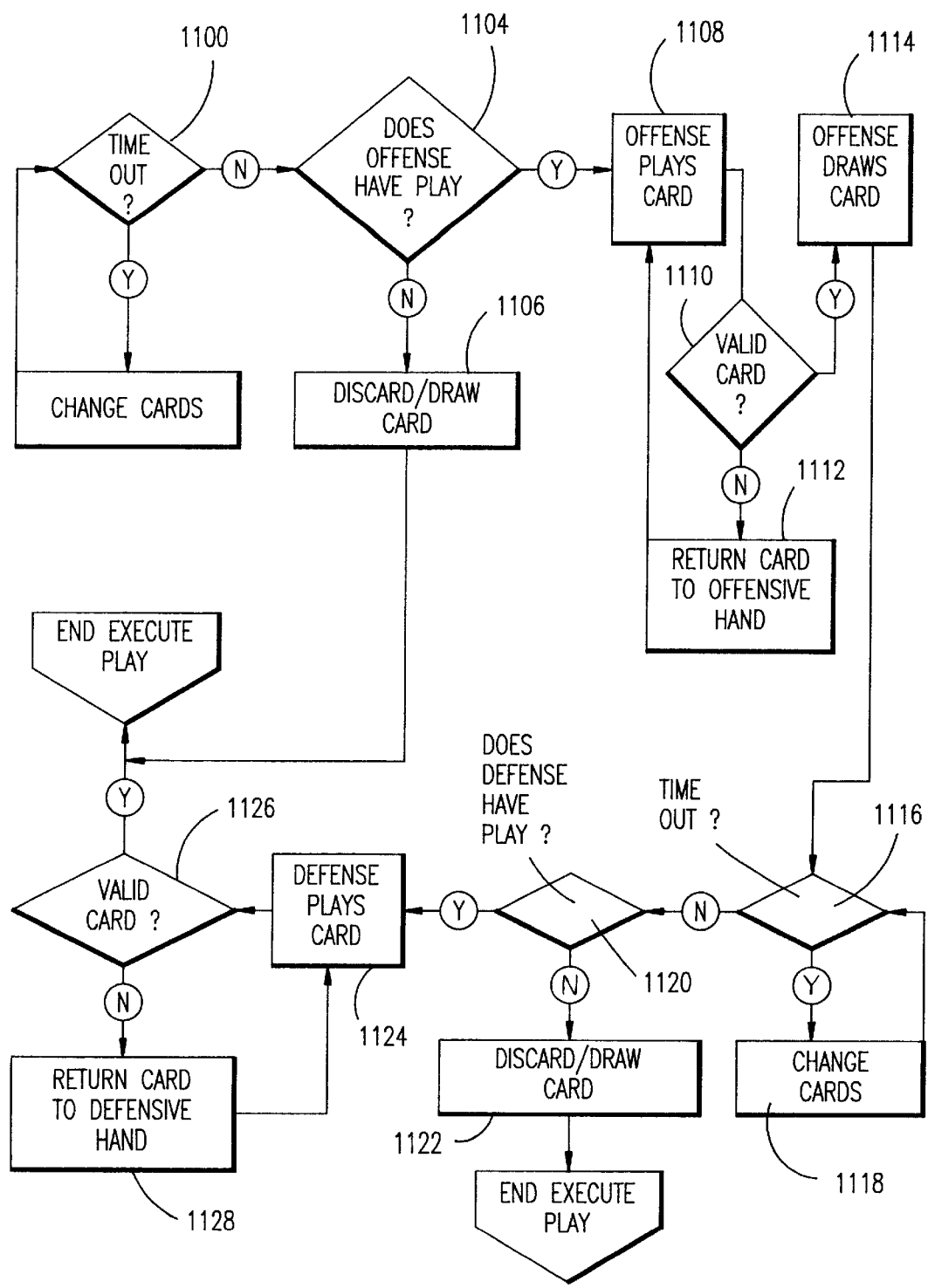
FIG. 7 shows a flowchart of the execution of a play during the game of the present invention.

The sub-steps making up step 1016 of FIG. 6 is shown in FIG. 7. Upon the beginning of play execution, in step 1100, the offensive player is given the option of declaring a time-out. If the offensive player declares a time out (a positive result in step 1100), then the current players hand is exchanged with a predetermined time-out hand in step 1102. If the offensive player chooses not to declare a time-out (a negative result in step 1100), then, in step 1104, the offensive player reviews his cards (in card status window 940) and determines whether or not he has an offensive play in his hand. If the offensive player does not have an offensive play among his cards (a negative result in step 1104), then the offensive player discards-and-draws a card from deck in the card status window 940 and the play (i.e., step 1016 in FIG. 6) is finished.

If the offensive player does have a card which he can play (a positive result in step 1104), then he plays the card in step 1108. Next, the card is checked to ensure that it is a valid card in step 1110. If the card is not valid (a negative result in step 1110) then the card is returned to the offensive players hand in step 1112 and the player must repeat step 1108. If the card is valid (a positive response in step 1110), then the offensive player draws a new card from the common deck to replace the played card in step 1114.

The defensive player now decides whether or not to call a time-out in step 1116. If the defensive player calls a time-out (a positive result in step 1116), then the offensive and defensive players change cards in step 1118 and step 1116 is repeated. If the defensive player chooses not to declare a time-out (a negative result in step 1116), then play proceeds to step 1120. In step 1120, the defensive player must decide if he has a card to play from the cards available in the defensive players card status window 940. If not (a negative result in step 1120), the defensive player discards one card and draws another from the common deck in card status window 940 and the play (i.e., step 1016 in FIG. 6) is finished.

If the defensive player does have a play (a positive result in step 1120), then the defensive player plays the card in step 1124. In step 1126, the defensive player card is checked to ensure that it is valid. If the defensive player's card is invalid (a negative result in step 1124), then the card is returned to the defensive player's hand in step 1128 and step 1124 is repeated. If the defensive player's card is deemed valid (a positive result in step 1126), then the play (i.e., step 1016 in FIG. 6) is finished.

Figure 8:
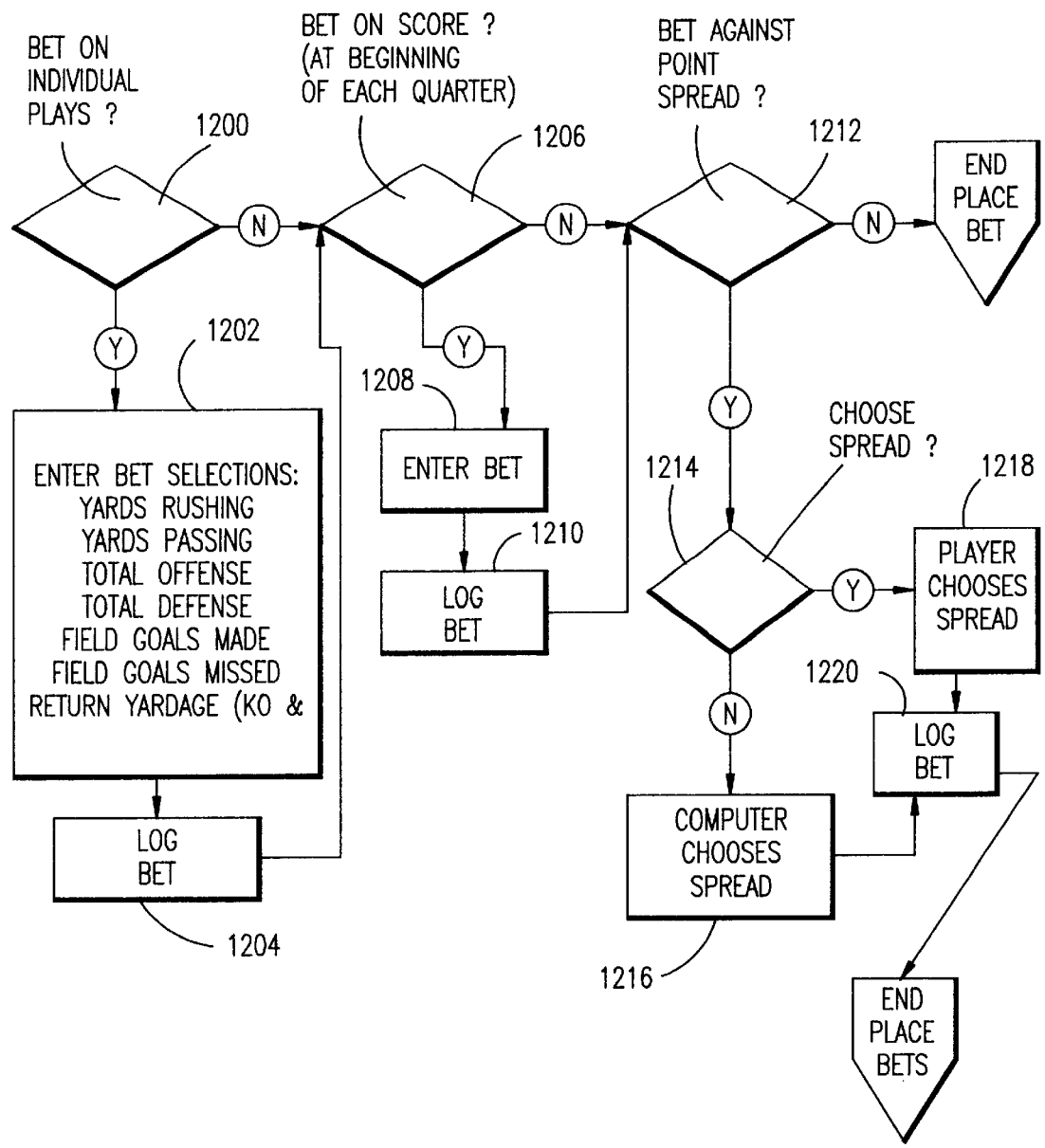
FIG. 8 shows a flowchart of the placement of a bet during the game of the present invention.

The sub-steps for placing bets (i.e., step 1014 in FIG. 6) is shown in FIG. 8. In the first sub-step 1200, the player is given the option of betting on individual plays. If the player so chooses (a positive result in step 1200), then the player is allowed to enter individual bet selections in step 1202. As is common among all of the above-mentioned steps, the individual bet selections in step 1202 affect RAM 18 parameters and, consequently, disk memory 20 parameters. In the case of step 1202, the affected parameters are yards rushing 314 and 314', yards passing 316 and 316', total offence 318 and 318', total defense 320 and 320', field goals made 322 and 322', field goals missed 324 and 324', kick-off return yards 326 and 326', and punt return yards 328 and 328'. Once the individual bets are selected in step 1202, the bet is logged in step 1204.

Next in step 1206 of FIG. 8, if it is the first play of the quarter, the player is given the opportunity to bet on the score at the end of the quarter. If the player elects to place a quarter-end bet (a positive result in step 1206), then the player enters the bet in step 1208 and the bet is subsequently logged in step 1210. After the bet has been logged in step 1210, or if the player chose not to bet on the score (a negative result in step 1206), then the player is offered the opportunity to bet against the point spread in step 1212. If the player chooses not to bet against the point spread, then the placement of bets (step 1014 of FIG. 6) is finished. If, however, the player chooses to bet against the point spread, the player is given the option of inputting the point spread himself or allowing the computer to do so in step 1214. If the player allows the computer to chose the spread (a negative result in step 1214), it does so in step 1216. If the player elects to chose the point spread, he does so in step 1218. In either case 1216 or 1218, the bet is logged in step 1220 and the placement of bets (step 1014 of FIG. 6) is finished.

Figure 9:
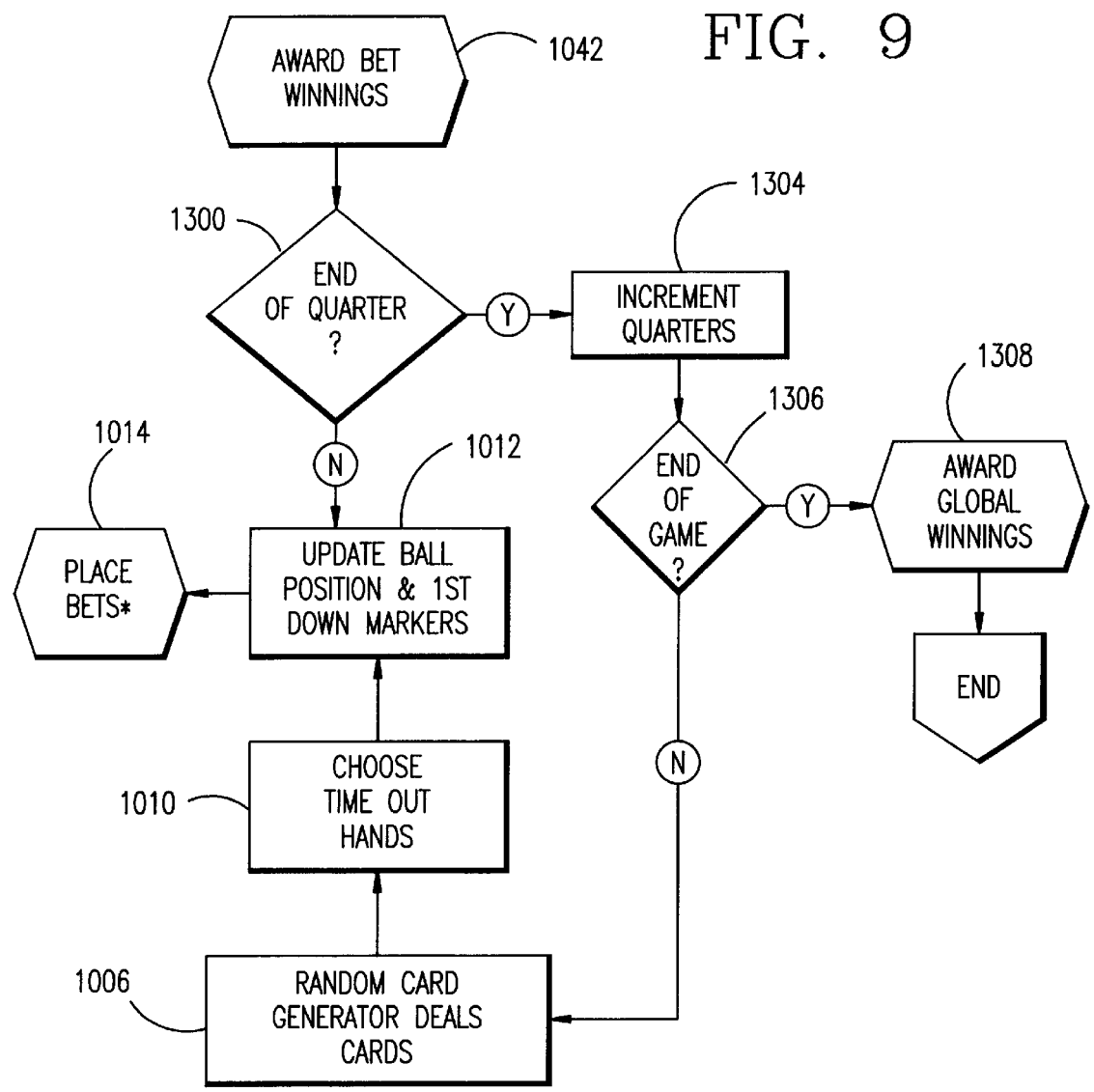
FIG. 9 shows a flowchart of the awarding of a bet during the game of the present invention.

The sub-steps taken to award bet winnings (step 1042 in FIG. 6) is shown in FIG. 9. First, in step 1300, it is determined if the previous quarter has ended. If so (a positive result in step 1300) then the quarter indicator (RAM 18 parameter 626 and disk memory 20 parameter 626') is incremented by one. After step 1304, the quarter indicator 626 is examined to determine if it exceeds 4 in step 1306. If the value of the quarter indicator is 5 (resulting in a positive result in step 1306) then the game is over and the global awards (first made in step 1004 of FIG. 6) are given out. If the value of the quarter indicator 626 is 4 or less (a negative result in step 1306), then the program 800 deals a new set of cards according to step 1010 of FIG. 6 and play resumes according to the flow diagram in FIG. 6. If the quarter has not ended (a negative in step 1300) then the ball position (scrimmage line) and down markers are determined according to step 1012 of FIG. 6 and play resumes from that step according to the flow diagram in FIG. 6.

The forgoing is a description of the arrangement and the operation of an embodiment of the invention. The scope of the invention is considered to include the described embodiment together with others obvious to those skilled in the art.

I claim:

1. A game machine for a user to place bets, execute plays, manipulate cards, and store statistics that make up a game of football composed of a first team and a second team, the first team being controlled by a first user, the second team being controlled by a remote second user connected to the game machine by a network, said game machine comprising:

display means comprising: (i) a game status window, (ii) a game window, (iii) a play execution window, (iv) a bet status window, (v) a card status window, and (vi) a game statistics window;

memory means for storing information about said football game, said information includes the teams, the plays, bets, cards, and statistics, the memory means responsive to input from a button interface means and a graphical interface means;

a first portion of the memory means stores graphical, textual, and numerical information of the bet based upon input from a user;

a second portion of the memory means stores graphical, textual, and numerical information of the cards based upon input from a user;

a third portion of the memory means stores graphical, textual, and numerical information of the plays based upon input from a user;

a fourth portion of the memory stores graphical, textual, and numerical information of said game based upon input from a user;

a fifth portion of the memory means stores graphical, textual, and numerical information about the statistics of said football game;

button interface means including a standard computer keyboard whereby a user can enter or modify graphical, textual and numerical input information regarding the football teams, the plays, the bets, the cards, the statistics, and said football game, the button interface means is for changing the parameters in the memory means;

graphical interface means for a user to locate, identify, and manipulate the textual and the numerical input information, the graphical user interface means further enabling a user to visually locate, identify, and manipulate icons designating the teams, cards, bets, plays, statistics, and said football game, the graphical interface means is for changing parameters in the memory means;

storage means for storing information about said football game including information regarding the plays, bets and cards corresponding to the information in the memory means;

a first portion of the storage means stores graphical, textual, and numerical information of the bet corresponding to the first portion of the memory means;

a second portion of the storage means stores graphical, textual, and numerical information of the cards corresponding to the second portion of the memory means;

a third portion of the storage means stores graphical, textual, and numerical information of the plays corresponding to the third portion of the memory means;

a fourth portion of the storage means stores graphical, textual and numerical information of the game corresponding to the fourth portion of the memory means;

a fifth portion of the storage means stores graphical, textual and numerical information of the statistics corresponding to the fifth portion of the memory means;

microprocessor means in connection with the display means, the memory means, and the storage means, the microprocessor means is used for processing information about said football game, plays, bets, statistics, and cards, the microprocessor means is further used for updating the windows in the display based upon a change in parameters in the memory means;

a write agent, the write agent overwrites the parameters in said storage means with corresponding parameters in the memory means;

communication means for writing the parameters in the memory means to a remote second game machine, the communication means is further used for receiving write statements to the storage means from the second game machine;

a snarf agent, the snarf agent snoops write signals to address locations of the parameters in the storage means, the snarf agent snarfs the snooped write signals and overwrites the corresponding parameters in the memory means, the snarf agent then triggers the microprocessor means to update the windows on the display based upon the parameters in the memory means.

2. A game machine as in claim 1 wherein the memory means is DRAM.

3. A game machine as in claim 1 wherein the storage means is a disk memory drive.

4. A game machine as in claim 1 wherein the card status window is in operative communication with the second portion of the memory means, the card status window comprises:

a first time-out hand;

a second time-out hand;

a first play hand;

a second play hand;

a playing deck;

a special teams deck; and a penalty deck.

5. A game machine as in claim 1 wherein the play execution window is in operative communication with the third portion of the memory means, the play execution window comprises:

an offensive time-out indicator;

a defensive time-out indicator;

an offensive play card slot;

a defensive play card slot; and a play result indicator.

6. A game machine as in claim 1 wherein the game status window is in operative communication with the fourth portion of the memory means, the game status window comprises:

a composition of the first football team;

a composition of the second football team;

a gridiron;

a plurality of yard markers spaced evenly on the gridiron;

a down indicator;

a player marker;

a score indicator;

a possession indicator;

a quarter indicator; and a statsheet.

7. A game machine as in claim 1 wherein the game statistics window is in operative communication with the fifth portion of the memory means, the game status window comprises:

a yards rushing indicator;

a yards passing indicator;

a total offense indicator;

a total defense indicator;

a field goals made indicator;

a field goals missed indicator;

a kickoff return yardage indicator;

a punt return yardage indicator; or any combination of the indicators.

8. A game machine for enabling a user to place bets, execute plays, manipulate cards, and store statistics that make up a game of football composed of a first team and a second team, the first team being controlled by a first user, the second team being controlled by a remote second user connected to said game machine by a network, said game machine comprising:

display means comprising a game status window, a game window, a play execution window, a bet status window, a card status window, and a game statistics window;

button interface means including a standard computer keyboard for a user to enter or modify graphical, textual and numerical input information regarding the football teams, the plays, the bets, the cards, the statistics, and the football game;

graphical interface means for a user to locate, identify, and manipulate the textual and the numerical input information, the graphical user interface means further enabling a user to visually locate, identify, and manipulate icons designating the teams, the cards, the bets, the plays, the statistics, and the football game;

memory means for storing information about the game including information regarding the teams, the plays, the bets, the cards, and the statistics, the memory means responsive to input from the button interface means and the graphical interface means;

a first portion of the memory means stores graphical, textual, and numerical information of the bet based upon input from a user;

a second portion of the memory means stores graphical, textual, and numerical information of the cards based upon input from a user;

a third portion of the memory means stores graphical, textual, and numerical information of the plays based upon input from a user;

a forth portion of the memory means stores graphical, textual, and numerical information of the game based upon input from a user;

a fifth portion of the memory means stores graphical, textual, and numerical information about the statistics of the football game;

storage means for storing information about the game including information regarding plays, bets and cards corresponding to the information in the memory means;

a first portion of the storage means stores graphical, textual, and numerical information of the cards corresponding to the second portion of the memory means;

a third portion of the storage means stores graphical, textual, and numerical information of the plays corresponding to the third portion of the memory means;

a fourth portion of the storage means stores graphical, textual and numerical information of the game corresponding to the fourth portion of the memory means;

a fifth portion of the storage means stores graphical, textual and numerical information of the statistics corresponding to the fifth portion of the memory means;

microprocessor means in connection with the display means, the memory means, and the storage means, the microprocessor used for processing information about the game, the plays, the bets, the statistics, and the cards;

means for causing the microprocessor to successively compare the memory means to the storage means in order to detect any discrepancy between the information stored in the storage means and the information in the memory means and, if such a discrepancy exists, to execute bet update means for updating the bet information, to execute play update means for updating the play information, to execute card update means for updating the card information, game update means for updating the game information, and display update means for updating the display means based upon the discrepancy; and communication means for writing the discrepancies between the memory means and the storage means to a remote second game machine, communication means is further used for receiving the second game machine discrepancies occurring on the second game machine and acting upon the second game machine discrepancies in the same manner as the display update means.

9. A game machine as in claim 1 or 8 wherein the bet status window is in operative communication with the first portion of the memory means, the bet status window comprises:

a bet-on-individual-play indicator;

a play-selection list consisting of the group of yards rushing, yards passing, total offense, total defense, field goals made, field goals missed, kick-off return yards, and punt return yards;

a bet-on-individual-play amount input box;

a bet-on-score indicator;

a first-quarter bet-on-score amount input box;

a second-quarter bet-on-score amount input box, a third-quarter bet-on-score amount input box, a fourth-quarter bet-on-score amount input box, a bet-on-point-spread indicator;

a choose-spread indicator;

a point-spread input box;

a bet-on-point-spread amount input box;

a current-bet award indicator; and a total-bet award indicator.

10. A game machine as in claim 8 wherein the bet update means comprises the steps of:

a. reading the bet-on-individual-play indicator;

b. if the bet-on-individual-play indicator is positive, then reading said play-selection list to determine a bet play identifier, the bet play identifier capable of reading information from the bet input means and determining if the bet is directed to one of a predetermined list of individual play characteristics, and if the bet is directed to the play characteristics to then log the bet in the memory means, wherein the bet update means further comprises a bet score identifier, the bet score identifier capable of reading information from the bet input means and determining if the bet is directed to a score at the end of a quarter of said game, and if the bet is directed to the score at the end of the quarter to then log the bet in the memory means, and wherein the bet update means further comprises a bet point-spread identifier, the bet point-spread identifier capable of reading information from the bet input means and determining if the bet is directed to a point-spread of said game, and if the bet is directed to a point-spread, to log the bet in the memory means.

11. The game of claim 8 wherein the graphical interface means include a mouse and a trackball.

* * * * *